United States Patent [19]
Allison

[11] 3,856,101
[45] Dec. 24, 1974

[54] POWER STEERING DEVICE
[75] Inventor: William D. Allison, Grosse Pointe Farms, Mich.
[73] Assignee: Ford Motor Company, Dearborn, Mich.
[22] Filed: Apr. 4, 1973
[21] Appl. No.: 347,962

[52] U.S. Cl. ........................................... 180/79.2 R
[51] Int. Cl. ............................................... B62d 5/06
[58] Field of Search .................. 180/79.2 R, 79.2 B; 251/294

[56] References Cited
UNITED STATES PATENTS
2,859,592  11/1958  Mercier et al. ................ 180/79.2 R
FOREIGN PATENTS OR APPLICATIONS
1,196,974  7/1965  Germany ........................ 180/79.2 R

*Primary Examiner*—David Schonberg
*Attorney, Agent, or Firm*—Clifford L. Sadler; Keith L. Zerschling

[57] ABSTRACT

A power steering device according to this disclosure has first and second pairs of chain sprockets that are drivingly interconnected by a pair of roller chains. One pair of the sprockets is connected to a steering wheel by a steering shaft. The other pair of sprockets is drivingly connected to the pinion of a rack and pinion steering gear. A resiliently mounted chain tensioning device engages the portions of the chains that span the space between the two pairs of sprockets. The chain tensioner is displaced laterally when torque is transmitted through the chains from one set of sprockets to the other. A power steering valve senses the lateral displacement of the chain tensioner and functions to direct pressure fluid to one side or the other of a power steering booster cylinder in response to the movement of the tensioner.

6 Claims, 5 Drawing Figures

POWER STEERING DEVICE

SUMMARY OF THE DISCLOSURE

In accordance with the presently preferred embodiment of this invention, first and second pairs of chain sprockets are interconnected by a pair of roller chains. One pair of sprockets is driven by a steering shaft which has a conventional steering wheel at its rearward end. The other pair of sprockets has a pinion drivingly connected to it. The pinion engages the rack of a rack and pinion steering gear.

A spring pressed lever mechanism engages the portions of the roller chains that span the gap between the two pairs of sprockets. This mechanism operates as a chain tensioner. When torque is transmitted from one pair of sprockets to the other pair through the roller chain, the chain tensioner responds to tensile load in the chains and is displaced laterally thereby.

A power steering valve is connected to the chain tensioner so that when it is displaced laterally in response to the transmission of torque, the valve element of the steering valve is displaced accordingly. Displacement of the power steering valve element directs pressure fluid from a fluid pressure source to one side or the other of a power steering booster cylinder. Actuation of the power steering booster cylinder provides a power assist to the manual operation of the vehicle steering system.

A power steering device constructed in accordance with this invention is characterized by its simplicity of construction and economy of manufacture. Many of the components of the device can be manufactured from inexpensive sheet metal stampings. The configuration of the assembly provides packaging advantages when installed in a motor vehicle.

BRIEF DESCRIPTION OF THE DRAWINGS

The many objects and advantages of a power steering device constructed in accordance with this invention will become apparent upon consideration of the following detailed discussion and the accompanying drawings, in which.

DETAILED DESCRIPTION OF THE PREFERRED EMBODIMENT

Figure 1:
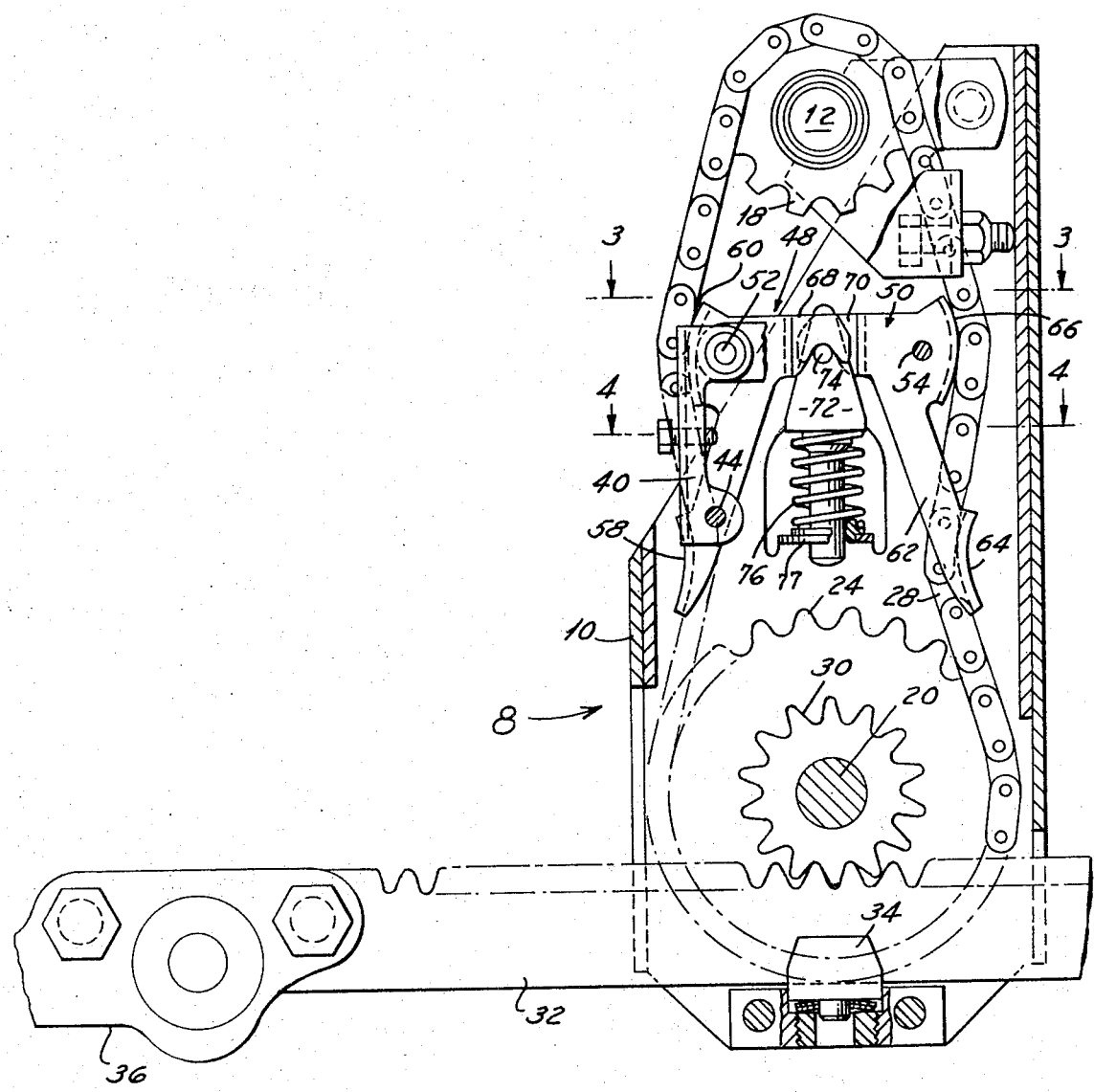
FIG. 1 is a front elevational view of a power steering device for a motor vehicle with a portion of the device broken away to show the inner construction.
Figure 2:
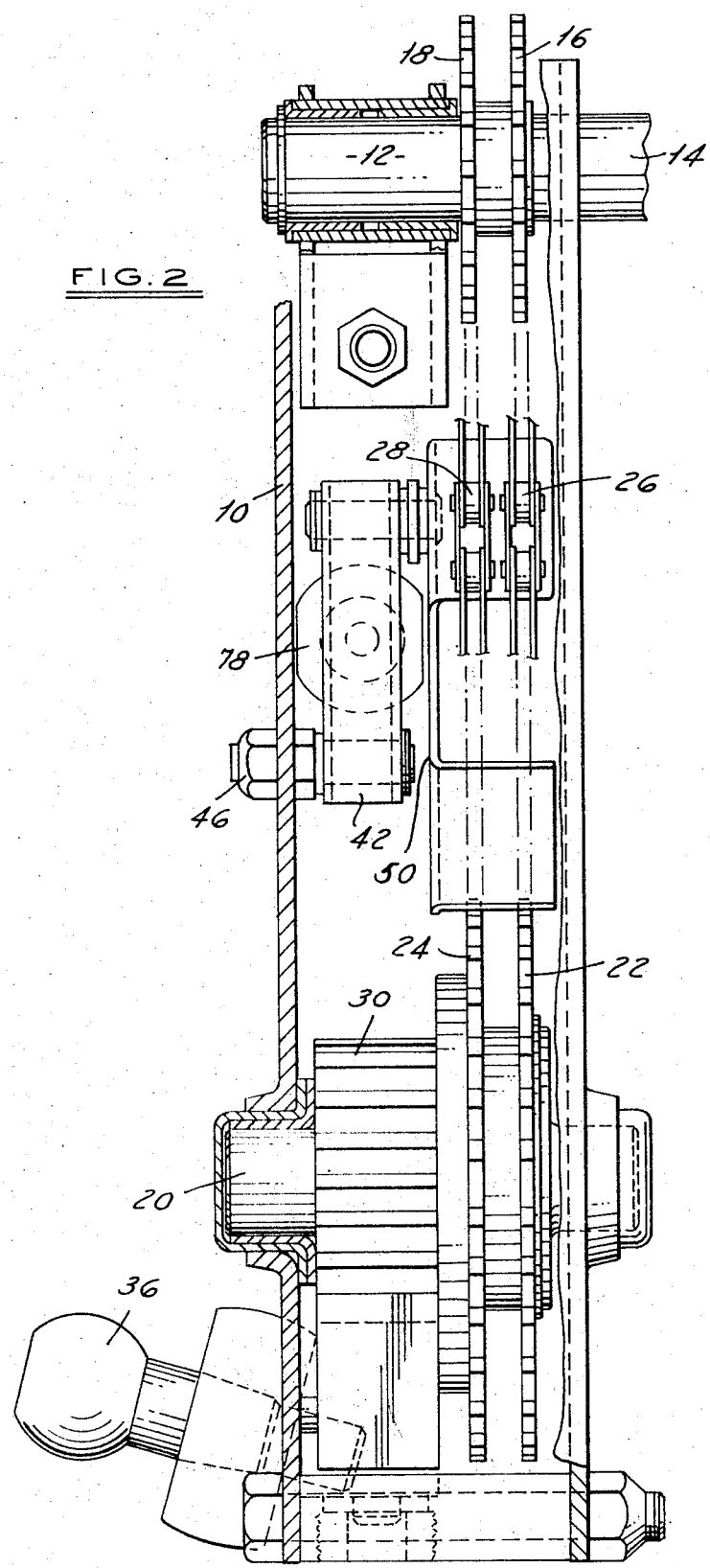
FIG. 2 is a side elevational view of the device of FIG. 1.
Figure 3:
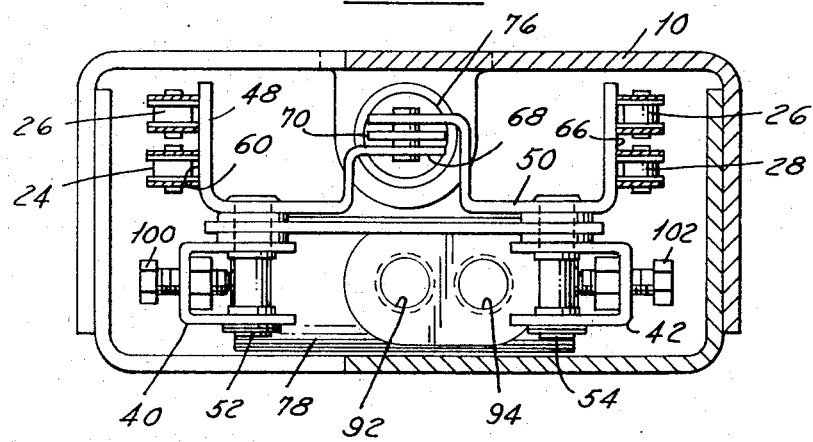
FIG. 3 is a sectional view taken along section lines 3—3 of FIG. 1.
Figure 4:
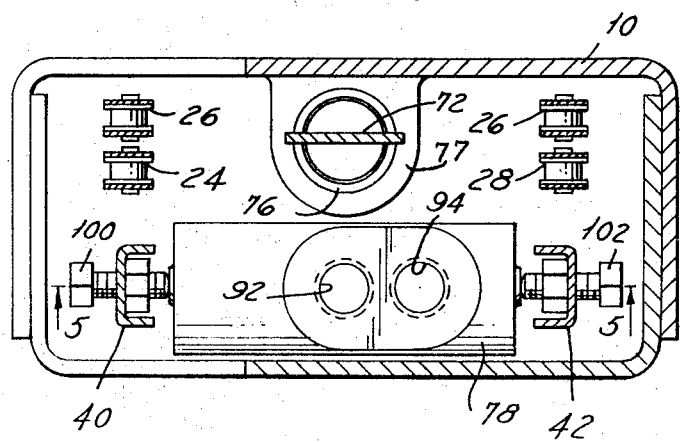
FIG. 4 is a sectional view taken along section lines 4—4 of FIG. 1.

Referring now to the drawings, wherein the presently preferred embodiment of this invention is shown, FIG. 1 illustrates a power steering device 8 for a motor vehicle. The power steering device 8 includes a rack and pinion steering gear, a chain type steering gear actuator and a power steering valve responsive to chain displacement.

The steering device 8 includes a metal housing 10 which rotatably supports a stub shaft 12 at its upper end. The shaft 12 is connected to a steering shaft assembly 14 which has a steering wheel supported on its rearward end. A pair of chain sprockets 16 and 18 are fixed to the shaft 12.

A second shaft 20 is rotatably supported at the lower end of the housing 10 and has a pair of driven chain sprockets 22 and 24 connected thereto. Roller chain 26 engages the sprockets 16 and 22 and provides a driving connection therebetween. Roller chain 28 interconnects sprockets 18 and 24 to provide a driving connection therebetween. Either chain 26 or 28 has the capacity to transmit steering load from the steering shaft 14 to the shaft 20 of sprockets 22, 24. Two chains are provided as a contingency against the unlikely event there is an inadvertent mechanical failure of one of the chain drives.

A pinion 30 is mounted on the shaft 20 and is constructed to rotate with the driven sprockets 22 and 24. The pinion 30 engages the teeth of a rack 32. The rack 32 is urged into meshing engagement with the pinion 30 by spring pressed device 34. The rack 32 is connected in a conventional fashion to the steering linkage 36 of a motor vehicle steering system.

In accordance with the present invention, a resiliently mounted tensioning device engages the portions of the roller chains 26, 28 which extends between the two pairs of sprockets 16, 18 and 22, 24. The chain tensioner includes a pair of upstanding links 40 and 42 which have their lower ends pivotally connected by pivot bolts 44 and and 46, respectively, to the housing 10. In FIG. 1, the link 42 is not shown in order to reveal the other elements of the chain tensioner.

The links 40 and 42 extend upwardly from their pivot pins 44 and 46. A pair of generally L-shape lever members 48 and 50 are pivotally supported by the links 40 and 42. The L-shape member 48 is connected to the link 40 by a pivot pin 52. The upper end of the upstanding link 42 is pivotally connected to the L-shape member 50 by a pivot pin 54. A rigid cross link 56 interconnects the pivot pins 52 and 54.

The housing 10, the upstanding links 40 and 42, and the cross link 56 form a parallelogram linkage system for the support of the L-shape members 48 and 50.

L-shape member 48 has an arcuate bearing surface 58 that faces inwardly and engages the chains 26 and 28. The bearing surface 58 is supported by a depending arm portion of the member 48. The member 48 also has an arcuate bearing surface 60 that faces outwardly and engages the chains 26 and 28.

L-shape member 50 has a depending arm 62 with a bearing portion 64 of arcuate shape that faces inwardly and engages portions of the chains 26 and 28 that span the two sets of sprockets. An arcuate bearing portion 66 on the member 50 faces outwardly and engages the chains 26 and 28.

The L-shape members 48 and 50 have inwardly directed arms 68 and 70 which overlap. An intermediate member 72 has a cross pin 74 that engages aligned notches in the arm portions 68 and 70 of the members 48 and 50. The intermediate member 72 is urged upwardly by a coil spring 76 that is interposed between a shoulder formed on the intermediate member 72 and a support bracket portion 77 of the housing 10. The spring 76 urges the cross pin 74 carried by the intermediate member 72 upwardly into engagement with the arms 68 and 70 whereby the members 48 and 50 are urged in counterclockwise and clockwise rotation, respectively, (as viewed in FIG. 1).

The spring force on the L-shape members 48 and 50 causes their respective bearing members 58, 60 and 64, 66 to engage the chains 26 and 28. The portions of the chains 26, 28 that expand between the two pairs of sprockets assume an ogee configuration under the force of the spring 76 on the members 48, 50.

When torque is transmitted from one pair of sprockets to the other pair of sprockets through the chains 26 and 28, the ogee shape portion of the chains carrying the tensile load will tend to straighten. The straightening of the chain will cause the L-shape members 48 and 50 to pivot against the force of the spring 76. Because the members 48 and 50 are supported by articulated links 40, 42 and cross link 56, the entire linkage mechanism of the chain tensioner will be shifted laterally when the chains are loaded.

In accordance with the present invention, a power steering valve is provided which senses lateral displacement of the linkage type chain tensioner. A power steering valve 78 is mounted on the housing 10 in a position between the upstanding links 40 and 42. The power steering valve 78 is of the open center type and has a laterally shiftable spool type valve element 81 disposed within a central bore 80. The spool valve element 81 has a pair of end lands 82 and 84 and a central land 86.

The body of the valve 78 has a pressure inlet port 88 that is constructed to be connected to the outlet of a power steering pump. A return port 90 is arranged to be connected to the fluid return or sump of the power steering pump. The inlet port 88 communicates with an annular groove formed on the wall of the bore 80. The lands 84 and 86 are normally disposed on either side of the groove of port 88. A return port 90 communicates with a groove formed in the bore 80 that is normally situated between the valve lands 82 and 86.

A first outlet port 92 connects to a centrally situated annular groove in the wall of bore 80. A second outlet port 94 is connected by a first passage with a groove in the bore 80 that is normally in alignment with the valve land 84. An internal passage 95 provides communication between the second outlet port 94 and a groove in the bore 80 that is in alignment with the valve land 82.

Figure 5:
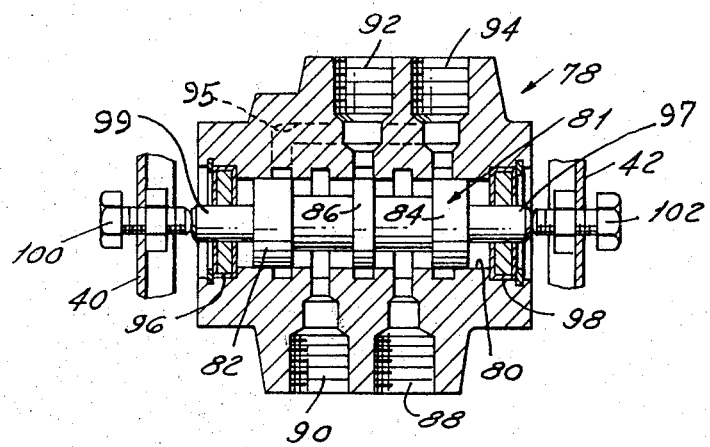
FIG. 5 is a sectional view of the power steering valve taken along section line 5—5 of FIG. 4.

Under normal straight-ahead drive conditions the components will assume the orientation shown in FIG. 5. With the inlet port 88 connected to a power steering pump, pressure fluid will enter the port 88, flow axially past the periphery of the valve land 86 and out the return port 90. There will be no pressure buildup at the first and second outlet ports 92 and 94.

In the event the spool valve element 81 is shifted to the right, the valve land 86 will be displaced into sealed engagement with the bore 80 closing the direct passage of pressure fluid to the return port 90. Fluid will flow from inlet port 88 through the second outlet port 94 to one side of a power steering booster cylinder (not shown). Under these circumstances, the displacement of the spool valve 81 will provide communication between the first outlet port 92 and the return port 90.

In the event the spool 81 is shifted to the left, direct communication between the pressure inlet port 88 and the return port 90 will again be sealed by the central valve land 86. The second outlet port 94 will be closed and fluid will flow from the inlet port 88 to the first outlet port 92 and to the other side of the power steering booster cylinder. With the spool valve element 81 shifted to the left, second outlet port 94 will be in communication with the return port 90.

In accordance with the present invention, means are provided to sense the transmission of torque from one pair of sprockets to the other pair of sprockets and to actuate the power steering valve 78 in accordance therewith.

The power steering valve 78 is mounted in the housing 10 between the upstanding levers 40 and 42. The spool valve element 80 has end portions 97 and 99 which protrude through seals 96 and 98 situated at the ends of the bore 80. The levers 40 and 42 have adjustment screws 100 and 102 with inner ends that are in engagement with the exposed ends 97 and 99 of the spool valve 81. As previously explained when torque is transmitted from the sprockets 16, 18 to the sprockets 22, 24 by rotation of the steering shaft 14, the ogee portions of the chains 26 and 28 that are under a tensile load will straighten in opposition to the bias imposed thereon by the spring pressed L-shape members 48 and 50. The straightening of the chains under load will cause the members 48 and 50 to rotate and the entire linkage assembly to shift laterally a small amount. The displacement of the upstanding links 40 and 42 will be sensed by the spool valve element 81 which will be shifted a corresponding amount. The displacement of the spool valve 81 will direct power steering fluid to the appropriate side of the power steering booster cylinder. The power cylinder engages the rack 32 and is constructed to provide a boost or power assist to the operation of the rack and pinion steering gear.

A power steering device, in accordance with this invention, provides a chain operated steering gear actuator having a resiliently mounted tension sensing means to actuate a power steering valve. The construction is particularly characterized by its simplicity and economy of manufacture. The majority of the components of the assembly can be manufactured from stamped sheet metal.

The foregoing description presents the presently preferred embodiment of this invention. Modifications and alterations may occur to those skilled in the art which will come within the scope and spirit of the following claims.

I claim:

1. A steering device for a motor vehicle steering system comprising a rack and pinion steering gear, a steering gear actuator and a power steering valve;

said steering gear actuator having an input sprocket constructed to be connected to a vehicle steering wheel;

said actuator having an output sprocket connected to the pinion of said rack and pinion steering gear;

a drive chain drivingly interconnecting said input and output sprockets;

a chain tensioner having a parallelogram linkage system; element;

said pair of L-shape members having inwardly directed overlapping arms;

spring means coupled to said members and urging each of said members into engagement with said chain at a pair of spaced locations;

said spring means engaging said overlapping arms and urging one of said members in a counterclockwise direction and the other of said members in a clockwise direction;

said spring urged members biasing portions of said chain into generally ogee configurations;

said members and said linkage system being displaceable when one of said chain portions is under a tensile load;

a power steering valve having a laterally displaceable valve elemtn;

said power steering valve being constructed to provide communication between a fluid pressure source and a power steering booster cylinder in accordance with the position of said displaceable valve element;

means coupling said valve element with said chain tensioner;

said coupling means being constructed to displace said valve element in response to displacement of said chain tensioner when said one portion of said chain is under a tensile load.

2. A power steering unit for a motor vehicle steering system comprising a housing and an input sprocket rotatably supported in said housing;

said input sprocket being constructed to be connected to a vehicle steering wheel;

an output sprocket rotatably supported in said housing;

a pinion rigidly secured to said output sprocket;

a rack slidably supported in said housing and in mesh engagement with said pinion;

said rack being constructed to be connected to a steering linkage mechanism;

a drive chain drivably interconnecting said input and output sprockets and having laterally spaced apart first and second spans extending between said sprockets;

a combination chain tensioner and load sensing means comprising a laterally displaceable support connected to said housing;

first and second members pivotally supported on said support and engaging said first and second spans, respectively;

each of said members engaging its respective span at two spaced locations;

spring means coupled to said first and second members and urging said members into engagement with said first and second spans;

each of said spans normally having a generally ogee configuration in response to the spring force exerted by said spring means on said first and second members;

said first and second members and said support being laterally displaceable in response to a tensile load in one of said spans that exceeds a tensile load in the other of said spans;

a power steering valve having a valve body supported on said housing and a laterally displaceable valve element situated within said body;

means coupling said valve element with said first and second members;

said coupling means being constructed to displace said valve element in response to displacement of said members when said one span of said chain is placed under a tensile load that exceeds the tensile load in said other span;

said power steering valve being constructed to provide communication between a fluid pressure source and a power steering booster cylinder in accordance with the position of said displaceable valve element.

3. A power steering unit for a motor vehicle steering system comprising a housing and an input sprocket rotatably supported in said housing;

said input sprocket being constructed to be connected to a vehicle steering wheel;

an output sprocket rotatably supported in said housing;

a pinion rigidly secured to said output sprocket;

a rack slidably supported in said housing and in mesh engagement with said pinion;

said rack being constructed to be connected to a steering linkage mechanism;

a drive chain drivably interconnecting said input and output sprockets and having laterally spaced apart first and second spans extending between said sprockets;

a combination chain tensioner and load sensing means comprising a linkage system supported on said housing and having a laterally displaceable portion;

first and second members pivotally supported on said portion of said linkage system and engaging said first and second spans, respectively;

each of said members engaging its respective span at two spaced locations;

spring means coupled to said first and second members and urging said members into engagement with said first and second spans;

each of said spans normally having a generally ogee configuration in response to the spring force exerted by said spring means on said first and second members;

said first and second members being laterally displaceable relative to said housing in response to a tensile load in one of said spans that exceeds a tensile load in the other of said spans;

a power steering valve having a valve body supported on said housing and a laterally displaceable valve element situated within said body;

means coupling said valve element with said first and second members;

said coupling means being constructed to displace said valve element in response to displacement of said members when said one span of said chain is placed under a tensile load that exceeds the tensile load in said other span;

said power steering valve being constructed to provide communication between a fluid pressure source and a power steering booster cylinder in accordance with the position of said displaceable valve element.

4. A power steering unit according to claim 3 and including:

said first and second members each having a first leg portion engaging said first and second spans, respectively;

said first and second members each having a second leg portion engaging said spring means.

5. A power steering unit according to claim 4 and including:

said first and second members each having a generally L-shape.

6. A power steering unit according to claim 4 and including:

said linkage system being a parallelogram type linkage system.

* * * * *

UNITED STATES PATENT OFFICE
CERTIFICATE OF CORRECTION

PATENT NO. : 3,856,101
DATED : December 24, 1974
INVENTOR(S) : William D. Allison It is certified that error appears in the above-identified patent and that said Letters Patent are hereby corrected as shown below:

Column 4, line 58, delete "element;"

Column 4, after line 58, enter the following new paragraph

-- a pair of generally L-shape members supported by said linkage systems.--

Column 5, line 7, change "elemtn" to -- element--

Signed and Sealed this

Twentieth Day of July 1976

[SEAL]

Attest:

RUTH C. MASON
Attesting Officer

C. MARSHALL DANN
Commissioner of Patents and Trademarks